Patented Oct. 12, 1954

2,691,670

UNITED STATES PATENT OFFICE 2,691,670

CARBONYLATION OF AROMATIC HALIDES

Georges E. Tabet, Wilmington, Del., assignor to E. I. du Pont de Nemours and Company, Wilmington, Del., a corporation of Delaware No Drawing. Application October 17, 1951,
Serial No. 251,815

4 Claims. (Cl. 260—465)

This invention relates to a novel process for carbonylation of aryl halides, such as monochlorobenzene, dichlorobenzene and related compounds, to form aromatic acid amides and nitriles thereof. The specific improvement to which the present invention is directed relates to the use of organic reagents containing a nitrogen-hydrogen linkage, in combination with an aryl halide reactant, carbon monoxide and nickel-containing catalyst.

The term "carbonylation" as employed herein means the introduction of C=O into an organic molecule.

It has been disclosed heretofore that the carbonylation of aryl halides takes place efficiently in the presence of carbonyls of metals of the iron sub-group, especially if an alkoxy donor is present which is capable of converting the aroyl halide (which is initially formed) to an ester of the corresponding aromatic acid (Prichard and Tabet U. S. 2,565,462; cf. also Bliss and Southworth U. S. 2,565,461).

An object of the present invention is to provide a process for preparing aromatic acid amides and nitriles thereof by carbonylation of aryl halides. Another object of the invention is to provide a process for the carbonylation of aryl halides in the presence of aroyl halide acceptors other than alkoxy donors. Other objects of the invention will appear hereinafter.

The present invention provides a novel method for the carbonylation of aryl halides, in the presence of a nickel-containing catalyst and an organic reactant having at least one hydrogen atom directly attached to a nitrogen atom, e. g. an organic acid amide, preferably an amide having

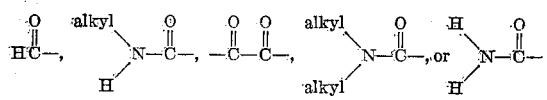

attached directly to amido nitrogen. Amines of the formula R₂NH or RNH₂ wherein R is alkyl or cycloalkyl also constitute a preferred class. These organic nitrogen-containing compounds which are employed as acceptors for the aroyl halides and which in particular instances act as carbon monoxide carriers or donors, in the practice of the invention, include amines and amides having at least one hydrogen atom attached directly to nitrogen. Examples of such organic reactants include urea, formamide, oxamide, alkanoic and cycloalkanoic acid amides, aromatic acid amindes, primary alkyl amines, secondary alkyl amines, ethers of the said alkyl amines, and the like, and mixtures of the said organic reactants. For reasons explained hereinafter, aqueous ammonia is not employed, but anhydrous ammonia (which results in the formation of nitriles) may be used.

The catalysts, which are required, include metallic nickel, nickel carbonyls, nickel salts of organic and inorganic acids and nickel compounds in general, especially those which are readily capable of being converted to nickel carbonyl under the reaction conditions.

The aryl halide reactants contain chlorine, bromine, or iodine attached directly to an aromatic nucleus. Such compounds include monochlorobenzene, o-dichlorobenzene, p-dichlorobenzene, chloronaphthalenes, chloranthracenes, and the corresponding bromo and iodo compounds. Substituted aromatic halides such as cyanochloro aromatic compounds, and aromatic halides containing nitro, —SO₃H, alkyl, etc., substituents may be used with equal effectiveness.

The carbonylation of aryl halides in the presence of the organic nitrogen-containing reactants hereinabove described may be illustrated by means of the following equation:

$$ClC_6H_4Cl + 2CO + 2HCONH_2 \longrightarrow$$

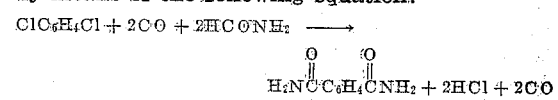

When the dichlorobenzene, which is employed in accordance with the foregoing equation, is p-dichlorobenzene, the carbonylation product is a mixture of terephthalic acid amide and terephthalic nitrile.

The organic nitrogen-containing compounds which are most preferably employed in the practice of the invention are formamide, urea, and oxamide. Each of these reactants serves as an acceptor for the intermediate aroyl halide without producing excessive amounts of products other than the amides and nitriles of the aromatic acid corresponding to the said aryl halide.

In general, relatively small amounts of nickel-containing catalyst are effective. For example, good results are obtained when the quantity of nickel carbonyl employed as catalyst is only about 0.1 mol per mol of carbon monoxide undergoing reaction. Nickel salts are also highly effective even in very low concentration. Good results are obtained when the quantity of catalyst is such that the content of nickel in the reaction mixture is about 0.05 to 0.5 mol per mol of haloaromatic being reacted.

The carbonylation of aryl halides in accordance with this invention takes place at temperatures as low as about 200° C., although optimum results are obtained at temperatures within the range of about 250° to 350° C. In general, superatmospheric pressures are employed, best results being obtained at pressures within the range of 200 to 1500 atmospheres.

Any suitable reaction vessel adapted to use under continuous flow conditions or under conditions of batchwise operation may be employed in the practice of the invention. The reaction vessels may be made of or lined with inert materials such as ceramics, stainless steel, noble metals, etc. The catalyst may be either dissolved or suspended in the reaction mixture, or, if desired, it may be present in the form of a fixed bed. Fluidized solid catalysts may also be employed. Carriers or inert catalyst supports such as silica gel, charcoal, etc. may be used if desired. In the continuous reaction systems, conditions of straight line flow or turbulent flow may be employed. The reactants may be introduced at one or more points along a tubular reaction vessel, if desired, but this is generally not a necessary method for carrying out the process of the invention.

Any convenient method such as distillation or crystallization may be applied for separating the carbonylation products from the reaction mixture obtained in practicing the invention.

The nitriles which are produced may be formed at least in part by dehydration of the corresponding amides which are present in the products. When it is desired to produce only nitrile, or a relatively high proportion of nitrile, dehydrating reagents or catalysts may be added to the reaction mixture, or to the reaction products, prior to recovering nitrile therefrom. Higher temperatures and use of anhydrous conditions would also favor formation of nitrile.

The quantity of carbon monoxide injected with the aryl halide may be varied over a rather wide range. When the amide reactor is itself a carbon monoxide donor (e. g. formamide), the reaction takes place even in the absence of added carbon monoxide; nevertheless, for best results it is essential to employ carbon monoxide from an external source, since this facilitates applying a sufficiently high pressure of carbon monoxide to effect the desired carbonylation reaction. From the standpoint of economy, it is not preferred to employ a large excess of carbon monoxide, although the carbonylation reaction takes place most satisfactorily when the quantity of carbon monoxide is stoichiometrically in excess of the quantity required for the carbonylation reaction. Hydrogen may be present as such in the reaction mixture and in some instances it exerts a somewhat beneficial effect.

The invention is illustrated further by means of the following examples:

*Example 1.*—In a series of experiments which were carried out in stainless steel shaker tubes at a temperature of 300 to 350° C. (reaction time 2 hours) under autogenous pressure of about 400 to 600 atmospheres, the halo-aromatic compounds listed in the following table were heated with carbon monoxide in the presence of a benzene solution of nickel carbonyl (0.2 mol Ni (CO)$_4$ per 100 cc. of benzene solvent). The results obtained in these experiments are set forth in the table which follows:

*Table I.—Carbonylation of halo-aromatics in amide-donor media*

| Halo-aromatic (mol) | Amide Donor (mol) | Conv. Percent to— | | Yield, Percent |
| --- | --- | --- | --- | --- |
| | | Amide | Nitrile | |
| p-ClC$_6$C$_4$CH$_3$, 0.2 | HCONH$_2$, 1.0 | 40 | 40 | 80 |
| C$_6$H$_5$Cl, 0.2 | Urea, 0.2 | 40 | 19 | 59 |
| C$_6$H$_5$Cl, 0.2 | Oxamide, 0.2 | 15 | 60 | 75 |

*Example 2.*—A mixture consisting of p-dichlorobenzene (0.1 mol), 32 grams nickel carbonyl (0.2 mol), and 9 grams of formamide (0.2 mol) in 100 cc. of benzene was heated at 300° C. for two hours in a stainless steel shaker tube. The resulting mixture was withdrawn from the reaction vessel and was filtered to remove inorganic salts. The filtrate was distilled and, after removal of the benzene solvent, 11.0 grams of residue containing p-chlorobenzonitrile was obtained. This residue was extracted with ethyl alcohol to remove p-chloro benzonitrile and p-chlorobenzamide and the residue was dissolved in hot benzene. Upon cooling, the benzene solution, 1.5 grams of terephthalonitrile (melting point 220 to 225° C.) was obtained.

*Example 3.*—A mixture consisting of 27.4 grams of p-chlorobenzonitrile (0.2 mol), 34 grams of nickel carbonyl (0.2 mol), 26 grams oxamide (0.2 mol) and 100 cc. of benzene solvent was charged into a stainless steel shaker tube and heated under autogenous pressure at 300° to 350° C. for two hours. The resulting mixture was withdrawn from the reaction vessel and filtered to remove nickel salts. Distillation of the filtrate gave 14.9 grams of a solid organic residue after recovery of benzene. This residue was crystallized from hot benzene yielding 7 grams of terephthalonitrile.

*Example 4.*—A mixture of 26 grams p-chlorotoluene, 36 grams Ni(CO)$_4$ and 50 grams of cyclohexyl amine was heated in a stainless steel shaker tube (capacity 330 cc.) at 295° to 315° C. under autogenous pressure (ca. 400 atmospheres of carbon monoxide) for two hours. The product was discharged and distilled. All but 0.4 grams of the p-chlorotoluene had reacted. After recovery of a foreshot (115° to 120° C. at 3 to 4 mm.), a residue comprising a mixture of amides, including N-cyclohexyl-p-toluamide, was obtained.

*Example 5.*—A mixture consisting of 0.2 mol p-chlorotoluene, 1.0 mol of ammonia, 100 cc. benzene and 0.2 mol Ni(CO)$_4$ was heated at 300°–350° C. for two hours in a pressure-resistant vessel. Distillation of the resulting product gave 43% conversion to p-toluamide, and 15% conversion to p-toluic nitrile.

It is to be understood that the foregoing examples are illustrative only and that the numerous methods for practicing the invention will occur to those who are skilled in the art. For example, any unreacted aryl halide may be continuously recovered in the distillation step and recycled to the reaction zone. Moreover, the amide can be produced in situ, if desired, although it is better to introduce it as such.

Numerous methods for working up carbonylation products such as those obtained by the process of this invention are known in the art. Some of these methods are taught in my U. S. Patent 2,565,464.

While the invention is not necessarily limited by any theoretical concepts, the practical applications do indeed appear to conform with the idea that the amine or amide reactant acts as a carbon monoxide "carrier" or "donor," as well as acting as an amide-forming "acceptor" for the acyl halide. In accord with this, anhydrous ammonia may be introduced, instead of an amine, whereby an amide or its dehydration product (the corresponding nitrile) is formed. In contrast therewith, aqueous ammonia cannot be employed in the method of this invention, since under the reaction conditions aqueous ammonia is converted to a salt, there being in that instance no acyl halide intermediate convertible to amide, and no amide-forming reactant.

The products obtained in the practice of this invention are highly useful in the manufacture of resins and resin intermediates. For example, the terephthalonitrile is useful as an intermediate for the manufacture of p-xylene-diamine, which in turn is a highly desirable intermediate in the manufacture of polyamide resins.

I claim:

1. A process for preparing amides and nitriles of aromatic acids which comprises heating an aryl chloride with carbon monoxide in the presence of nickel carbonyl at a temperature within the range of 200° to 450° C. in the presence of an amide of the class consisting of formamide, urea and oxamide under superatmospheric pressure, whereby a mixture of aromatic acid amide and aromatic nitrile is obtained, and thereafter separating the said amide and the said nitrile from the resulting mixture, the sole reactants present in the reaction mixture being the said aryl chloride, carbon monoxide, and amide.

2. The process of claim 1, wherein said chloroaromatic compound is chlorobenzene, said aromatic amide is benzamide, and said nitrile is benzonitrile.

3. The process of claim 1, wherein said aromatic chloride is p-chlorotoluene, said aromatic amide is p-toluic acid amide, and said nitrile is p-toluonitrile.

4. The process of claim 1, wherein said aromatic chloride is p-dichlorobenzene, said aromatic amide is terephthalic acid amide, and said nitrile is terephthalonitrile.

References Cited in the file of this patent

UNITED STATES PATENTS

| Number | Name | Date |
|---|---|---|
| 2,565,461 | Bliss et al. | Aug. 28, 1951 |

FOREIGN PATENTS

| Number | Country | Date |
|---|---|---|
| 537,610 | Germany | Nov. 6, 1931 |

OTHER REFERENCES

Karrer, "Organic Chemistry" (Elsevier, 2nd Eng. Ed.) page 210 (1946).